US009388905B2

(12) United States Patent
Takahashi (10) Patent No.: US 9,388,905 B2
(45) Date of Patent: Jul. 12, 2016

(54) MECHANICAL SEAL (75) Inventor: Hidekazu Takahashi, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 13/124,106

(22) PCT Filed: May 19, 2010

(86) PCT No.: PCT/JP2010/058419
§ 371 (c)(1),
(2), (4) Date: Apr. 13, 2011

(87) PCT Pub. No.: WO2011/036917
PCT Pub. Date: Mar. 31, 2011

(65) Prior Publication Data
US 2011/0198813 A1      Aug. 18, 2011

(30) Foreign Application Priority Data

Sep. 24, 2009   (JP) ................................. 2009-218361

(51) Int. Cl.
*F16J 15/34* (2006.01)
*F04D 29/12* (2006.01)
(52) U.S. Cl.
CPC .......... *F16J 15/3404* (2013.01); *F04D 29/122* (2013.01); *F04D 29/126* (2013.01); *F16J 15/3448* (2013.01); *F16J 15/3464* (2013.01)
(58) Field of Classification Search
USPC ................................. 277/359, 360, 370, 387
See application file for complete search history.

(56) References Cited

U.S. PATENT DOCUMENTS 2,252,526 A * 8/1941 Shenton .......................... 277/387
3,026,112 A * 3/1962 Mayer ............................ 277/388
(Continued)

FOREIGN PATENT DOCUMENTS

| CN | 2141488 | 9/1993 | ............... F16J 15/54 |
| CN | 2229579 | 6/1996 | ............... F16J 15/16 |

(Continued)

OTHER PUBLICATIONS

International Preliminary Report on Patentability for corresponding international application No. PCT/JP2010/058419, dated Apr. 11, 2012 (5 pgs).

(Continued)

*Primary Examiner* — Kristina Fulton
*Assistant Examiner* — Eugene G Byrd
(74) *Attorney, Agent, or Firm* — Hayes Soloway P.C.

(57) ABSTRACT

A mechanical seal of an "outside type" for sealing a sealed fluid that may leak from an inside periphery of a sliding face towards an outside periphery is provided. The seal includes a rotating-side sealing element and a stationary-side sealing element disposed so as to be situated externally with respect to a stuffing box. The stationary-side sealing element, which accommodates a spring, is installed on a seal cover that is secured to the housing. The rotating-side sealing element is installed on a collar that is installed directly on the rotating shaft. The rotating side, which comprises the rotating-side sealing element and the collar, is positioned such that rotation takes place in the atmosphere on a machine-exterior side. A balance ratio A2/A1 is 1 or less, A1 being an axial-direction projection area of the sliding face of the stationary-side sealing element and A2 being an axial-direction projection area that is subjected to a seal fluid pressure acting as a motive force in the axial direction relative to the stationary-side sealing element. An annular cooling jacket is disposed between an inside periphery of the housing and an outside periphery of the rotating shaft.

10 Claims, 3 Drawing Sheets (56) References Cited

U.S. PATENT DOCUMENTS

| | | | | |
|---|---|---|---|---|
| 3,155,393 A * | 11/1964 | Hummer | | 277/390 |
| 3,447,809 A * | 6/1969 | Wiese et al. | | 277/387 |
| 3,467,396 A * | 9/1969 | Hershey | | 277/362 |
| 3,477,729 A * | 11/1969 | Hershey | | 277/306 |
| 3,970,320 A * | 7/1976 | Wiese | | 277/359 |
| 4,088,330 A * | 5/1978 | Chernykh | | 277/362 |
| 4,109,920 A * | 8/1978 | Wiese | | 277/408 |
| 4,332,391 A * | 6/1982 | Arnold | | 277/370 |
| 4,377,290 A * | 3/1983 | Netzel | | 277/368 |
| 4,509,762 A * | 4/1985 | Garrett | | 277/398 |
| 4,545,588 A * | 10/1985 | Nagai et al. | | 277/348 |
| 5,125,792 A * | 6/1992 | Korenblit | | 415/112 |
| 5,188,377 A * | 2/1993 | Drumm | | 277/353 |
| 5,199,720 A * | 4/1993 | Radosav et al. | | 277/370 |
| 5,213,340 A * | 5/1993 | Azibert et al. | | 277/367 |
| 5,344,164 A * | 9/1994 | Carmody et al. | | 277/371 |
| 5,577,738 A * | 11/1996 | Fukuda | | 277/370 |
| 6,379,127 B1 | 4/2002 | Andrews et al. | | 417/423.11 |
| 6,485,024 B1 * | 11/2002 | Pippert et al. | | 277/370 |
| 6,708,980 B2 * | 3/2004 | Takahashi | | 277/380 |
| 6,932,348 B2 * | 8/2005 | Takahashi | | 277/359 |
| 6,935,632 B2 * | 8/2005 | Azibert et al. | | 277/370 |
| 6,959,929 B2 * | 11/2005 | Pugnet et al. | | 277/408 |
| 7,727,133 B2 * | 6/2010 | Lundberg et al. | | 492/15 |
| 7,857,319 B2 * | 12/2010 | Steigerwald et al. | | 277/359 |
| 7,878,509 B2 * | 2/2011 | Takahashi | | 277/359 |
| 2003/0202875 A1 * | 10/2003 | Pessin et al. | | 415/1 |
| 2007/0170655 A1 * | 7/2007 | Laitinen | | 277/359 |
| 2009/0194951 A1 * | 8/2009 | Cohen Zada Vaizman | | 277/513 |

FOREIGN PATENT DOCUMENTS

| | | | | |
|---|---|---|---|---|
| CN | 1409034 | 4/2003 | | F16J 15/06 |
| CN | 101031745 | 9/2007 | | F16J 15/34 |
| CN | 100406790 | 7/2008 | | F16J 15/06 |
| JP | 200298237 | 5/2002 | | F16J 15/34 |
| WO | WO2006022378 | 2/2006 | | F16J 15/34 |

OTHER PUBLICATIONS

Japanese Office Action (w/translation) issued in corresponding application No. 2010-546757, dated Aug. 20, 2013 (5 pgs).
Chinese Office Action (w/translation) issued in corresponding application No. 201080002226.5, dated Sep. 24, 2013 (13 pgs).
Chinese Office Action (w/English translation) issued in corresponding application No. 201080002226.5, dated Mar. 4, 2013 (10 pgs).

* cited by examiner

MECHANICAL SEAL

TECHNICAL FIELD

The present invention relates to a shaft seal unit for high temperature sealed liquids used, for example, in hot water pumps or hot oil pumps such as boiler feed pumps or condensate pumps in thermal power plants.

BACKGROUND ART

Figure 3:
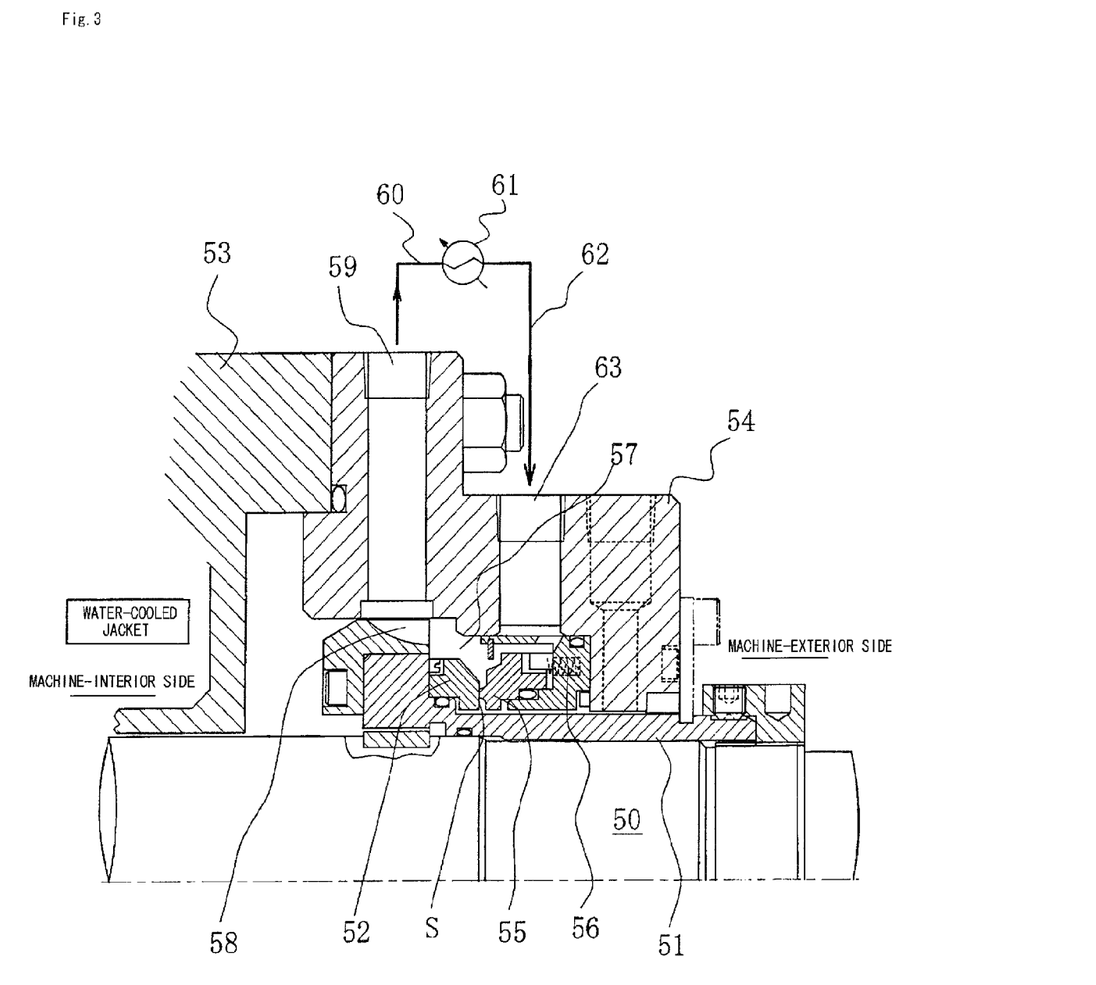
FIG. 3 is a front sectional view depicting Prior Art 1.

To date, shaft seal units like that depicted in FIG. 3 for example have been employed as shaft seal units used in hot water pumps or hot oil pumps such as boiler feed pumps or condensate pumps in thermal power plants.

The shaft seal unit according to the prior art depicted in FIG. 3 is furnished with a contact mechanical seal of an "inside" type (i.e., a design for sealing in a fluid that tends to leak towards the inside periphery direction from the outside periphery of the sliding faces). The shaft seal unit is designed such that a rotating-side sealing element 52 disposed next to a rotating shaft 50 that drives an internal pump impeller (not shown) and that is capable of rotating in unison with this rotating shaft 50 via a sleeve 51, and a stationary-side sealing element 55 disposed nonrotatably and capable of motive force in an axial direction on a seal cover 54 fixed to the housing 53 of the pump, are placed in intimate contact sliding at their mutually opposed end faces by a spring 56 that urges the stationary-side sealing element 55 in the axial direction. Specifically, the contact mechanical seal is intended to prevent high-temperature, high-pressure liquid inside the system (inside the pump) from leaking on the machine-exterior side from the outside periphery of the rotating shaft 50 at the mutual sliding portions S of the rotating-side sealing element 52 and the stationary-side sealing element 55.

When this type of contact mechanical seal is employed as shaft sealing means in a hot water pump or hot oil pump such as a boiler feed pump or condensate pump, the fact that the sealed fluid is at high temperature and high pressure means that the constituent components may experience deformation induced by pressure, or the high temperature sealed fluid or heat produced in the sliding portions S may give rise to thermal deformation and deterioration of materials of the constituent components, present concerns related to inconsistent sealing ability. Thus, in the prior art, some systems were configured such that a portion of the sealed fluid that flows in from inside the system and fills the space 57 to the outside periphery side of the mechanical seal is fed from a seal fluid outlet 59 of the seal cover 54 to a cooler 61 via a flushing line 60 by a partial impeller 58 formed on the sleeve 51 and rotating in unison with the rotating shaft 50, where the fluid is cooled and then recirculated into the space 57 via a flushing line 62 and a seal fluid inlet 63 of the seal cover 54, to effect cooling of the mechanical seal through this recirculation of the sealed fluid (hereinafter termed "Prior Art 1." See Patent document 1 for example).

However, Prior Art 1 discussed above has the following problems.

(1) In order to cool the mechanical seal, it is necessary to provide flushing lines, a cooler, and a large quantity of coolant for the cooler.

(2) A pumping ring is required, and there is an associated increase in the installation space required and in power consumption. Installing a pumping ring limits the length of the inside periphery of the stuffing box and the shaft throttle portion, and therefore the cooling effect of the water cooled jacket housed within the stuffing box is insufficient.

(3) Because the mechanical seal is a single seal of an "inside balanced" type, it is necessary for the rotating-side sealing element to be installed on the outside periphery of the sleeve, increasing the size of the mechanical seal by the equivalent of the sleeve thickness. If the mechanical seal is large in size, the peripheral speed at the sliding face increases, resulting in a high load on the sliding face. Also, the sliding face, which is the heat radiating component, is located inside the stuffing box, where it cannot be afforded cooling action by the outside air.

(4) The seal end face width of the mechanical seal exceeds 2.5 mm, and due to the high heat produced by sliding, flushing is indispensible in order to eliminate the heat; this requires a large flushing flow, which therefore necessitates high flow (Q)-pump head (H) on the part of the pumping ring.

(5) In order to cool the mechanical seal, in some instances water is supplied to the sliding portions S at the outside air side thereof (in the case of FIG. 3, to the inside of the sliding portions S) to carry out quenching, but due to the high temperature, the quenching water evaporates and deposits calcium present in the water, which in some instances may lead to seizing and leaking of the mechanical seal.

Another known mechanical seal structure is an externally mounted sleeveless mechanical seal of stationary of an "outside balanced type" wherein the mechanical seal is installed on the outside of the stuffing box, having a collar directly installed on the rotating shaft and a rotating ring installed on the outside periphery of the collar, and furnished with flushing equipment (hereinafter termed "Prior Art 2". See Patent document 2 for example).

However, Prior Art 2 also has the problem that in order to cool the mechanical seal, it is necessary to provide flushing lines, a cooler, and a large quantity of coolant for the cooler.

PRIOR ART REFERENCES

Patent Documents

Patent Document 1: Japanese Laid-Open Patent Application 2002-98237

Patent Document 2: Japanese Laid-Open Patent Application 2006-022378

DISCLOSURE OF THE INVENTION

Problem To Be Solved By The Invention

It is an object of the present invention to provide a mechanical seal for high temperature sealed liquids used, for example, in hot water pumps or hot oil pumps such as boiler feed pumps or condensate pumps in thermal power plants, wherein a construction in which a sealing element is installed outside the stuffing box and cooling means is disposed inside the stuffing box is employed, thereby giving the mechanical seal a no-flushing and no-cooler design.

Means for Solving the Problem

In order to attain the aforementioned object, the mechanical seal according to a first aspect of the present invention is a mechanical seal installed on a shaft seal portion formed between a housing and a rotating shaft, and providing a seal between the housing and the rotating shaft, the mechanical seal characterized in that the mechanical seal is of an "outside type" for sealing a sealed fluid that may leak from an inside periphery of a sliding face towards an outside periphery; a rotating-side sealing element and a stationary-side sealing element are disposed so as to be situated externally with respect to a stuffing box; the stationary-side sealing element, which accommodates a spring, is installed on a seal cover that is secured to the housing; the rotating-side sealing element is installed on a collar that is installed directly on the rotating shaft; the rotating side, which comprises the rotating-side sealing element and the collar, is positioned such that rotation takes place in the atmosphere on a machine-exterior side; a balance ratio A2/A1 is 1 or less, A1 being an axial-direction projection area of the sliding face of the stationary-side sealing element and A2 being an axial-direction projection area that is subjected to a seal fluid pressure acting as a motive force in the axial direction relative to the stationary-side sealing element; and an annular cooling jacket is disposed between an inside periphery of the housing and an outside periphery of the rotating shaft.

According to the first aspect, a no-flushing and no-cooler design is possible despite the sealed fluid being a high temperature fluid; in addition, since there is no need for flushing lines, a cooler, a coolant line for the cooler, and the like, not only is the initial cost lower for the mechanical seal, appreciable reduction in initial cost is possible due to the more compact size. Concomitantly, it is possible to avoid reduced thermal efficiency of the system as a whole due to cooled liquid entering the pipeline system. Moreover, coolant for the cooler is unnecessary, affording appreciable reductions in water usage while at the same time eliminating the need for maintenance of the cooler and flushing system. Additionally, there is no need for a pumping ring and ancillary components, and the stuffing box can be shorter, while because there is no need to operate a pumping ring, running costs are significantly lower as well.

Further, because the rotating-side sealing element and the stationary-side sealing element are installed on the outside of the stuffing box, heat of sliding is easily radiated away, and the cooling jacket disposed inside the stuffing box can have greater capacity. Additionally, because the rotating side is positioned such that rotation takes place in the atmosphere on the machine-exterior side, forced air cooling with outside air is possible.

Additionally, owing to the outside stationary balanced type sleeveless cartridge design, seal size may be reduced by the equivalent of the sleeve thickness, peripheral speed at the sliding face is lower, and the load on the sliding face is lower.

The mechanical seal according to a second aspect of the present invention is the mechanical seal according to the first aspect, characterized in that a coolant-accommodating space that communicates with coolant feed and discharge openings provided to the stuffing box is present in a central region of the cooling jacket, and the cooling jacket is hermetically installed along the inside periphery of the housing with O-rings interposed at the outside periphery on both ends; and the gap α between the outside periphery of the cooling jacket and the inside periphery of the housing is made larger than the gap β between the outside periphery of the rotating shaft and the inside periphery of the cooling jacket.

According to the second aspect, the gap between the outside periphery of the rotating shaft and the inside periphery of the cooling jacket may be kept extremely small and the volume of the intervening seal fluid present in this gap may be kept extremely small, whereby the cooling effect of the cooling jacket is maximized. Moreover, in the unlikely event of the rotating shaft wobbling and the outside periphery of the rotating shaft contacting the inside periphery of the cooling jacket, the fact that the impact is absorbed by the cushioning action provided by the elasticity of the O rings allows the contact surface pressure to be kept to a minimum, grinding or wear of the two components due to contact sliding to be prevented, and the initial gap to be maintained and cooling effect by the cooling jacket maximized for a long period of time.

The mechanical seal according to a third aspect of the present invention is the mechanical seal according to the second aspect, characterized in that a plurality of fins are disposed within the coolant-accommodating space towards the outside periphery of the rotating shaft.

According to the third aspect, the heat transmission area can be increased, and the axial length of the cooling jacket can be reduced.

The mechanical seal according to a fourth aspect of the present invention is the mechanical seal according to any of the first to third aspects, characterized in that the seal cover is provided with a quenching opening for supplying air or an inert gas such as nitrogen gas to a machine-exterior side of the sliding portions of the rotating-side sealing element and the stationary-side sealing element.

According to the fourth aspect, the sliding faces can be cooled directly, and cooling effect can be enhanced.

The mechanical seal according to a fifth aspect of the present invention is the mechanical seal according to any of the first to fourth aspects, characterized in that a lip seal made of a fluororesin is installed between the rotating-side sealing element and the collar, and the seal portion of the lip seal is caused to slide in contact with a restriction surface of the inside periphery of the seal cover.

According to the fifth aspect, any hazard posed by scattering of leaked fluid can be prevented, and leaked fluid does not scatter towards the bearing box, thus preventing damage to the bearing box.

Effects of the Invention

The present invention affords the following exceptional effects.

(1) The mechanical seal is of an "outside type" for sealing a sealed fluid that may leak from an inside periphery of a sliding face towards an outside periphery; a rotating-side sealing element and a stationary-side sealing element are disposed so as to be situated externally with respect to a stuffing box; the stationary-side sealing element, which accommodates a spring, is installed on a seal cover that is secured to the housing; the rotating-side sealing element is installed on a collar that is installed directly on the rotating shaft; the rotating side, which comprises the rotating-side sealing element and the collar, is positioned such that rotation takes place in the atmosphere on a machine-exterior side; a balance ratio A2/A1 is 1 or less, A1 being an axial-direction projection area of the sliding face of the stationary-side sealing element and A2 being an axial-direction projection area that is subjected to a seal fluid pressure acting as a motive force in the axial direction relative to the stationary-side sealing element; and an annular cooling jacket is disposed between an inside periphery of the housing and an outside periphery of the rotating shaft. Such a configuration affords a no-flushing and no-cooler design despite the sealed fluid being a high temperature fluid. In addition, since there is no need for flushing lines, a cooler, a coolant line for the cooler, and the like, not only is the initial cost lower for the mechanical seal, the initial cost can be appreciably reduced as a result of the more compact size. Concomitantly, it is possible to avoid reduced thermal efficiency of the system as a whole due to cooled liquid entering the pipeline system. Moreover, coolant for the cooler is unnecessary, affording appreciable reductions in water usage while at the same time eliminating the need for maintenance of the cooler and flushing system. Additionally, there is no need for a pumping ring or ancillary components, and the stuffing box can be shorter, while the absence of any need to operate a pumping ring significantly reduces running costs as well. Further, heat of sliding is easily radiated away, and the rotating side undergoes forced air cooling with outside air. Additionally, the seal size may be reduced by the equivalent of the sleeve thickness, whereby peripheral speed at the sliding face is lower, and the load on the sliding face is lower.

(2) A coolant-accommodating space that communicates with coolant feed and discharge openings provided to the stuffing box is present in a central region of the cooling jacket, and the cooling jacket is hermetically installed along the inside periphery of the housing with O-rings interposed at the outside periphery on both ends; and the gap between the outside periphery of the cooling jacket and the inside periphery of the housing is made larger than the gap between the outside periphery of the rotating shaft and the inside periphery of the cooling jacket. According to such a configuration, the gap between the outside periphery of the rotating shaft and the inside periphery of the cooling jacket may be constricted to an extremely small size and the intervening seal fluid present in this gap may be kept to an extremely small volume, so that the cooling effect of the cooling jacket is maximized. Moreover, in the unlikely event of the rotating shaft wobbling and the outside periphery of the rotating shaft contacting the inside periphery of the cooling jacket, the fact that the impact is absorbed by the cushioning action provided by the elasticity of the O rings allows the contact surface pressure to be kept to a minimum, grinding or wear of the two components due to contact sliding to be prevented, the initial gap to be maintained, and the cooling effect produced by the cooling jacket to be maximized for a prolonged period of time.

(3) A plurality of fins are disposed within the coolant-accommodating space towards the outside periphery of the rotating shaft, whereby the heat transmission area can be larger, and the axial length of the cooling jacket can be smaller.

(4) The seal cover is provided with a quenching opening for supplying air or an inert gas such as nitrogen gas to a machine-exterior side of the sliding portions of the rotating-side sealing element and the stationary-side sealing element, whereby the sliding faces can be cooled directly, and cooling effect can be enhanced.

(5) A lip seal made of a fluororesin is installed between the rotating-side sealing element and the collar, and the seal portion of the lip seal is caused to slide in contact with a restriction surface of the inside periphery of the seal cover. According to such a configuration, any hazard posed by scattering of leaked fluid can be prevented, and leaked fluid does not scatter towards the bearing box, thus preventing damage to the bearing.

MODE FOR CARRYING OUT THE INVENTION

A preferred mode for carrying out the mechanical seal according to the present invention is described in detail herein with reference to the accompanying drawings, but the invention should not be construed as being limited to the disclosure herein; various changes, modifications, and improvements will be apparent to the practitioner of the art without departing from the scope of the invention.

Figure 1:
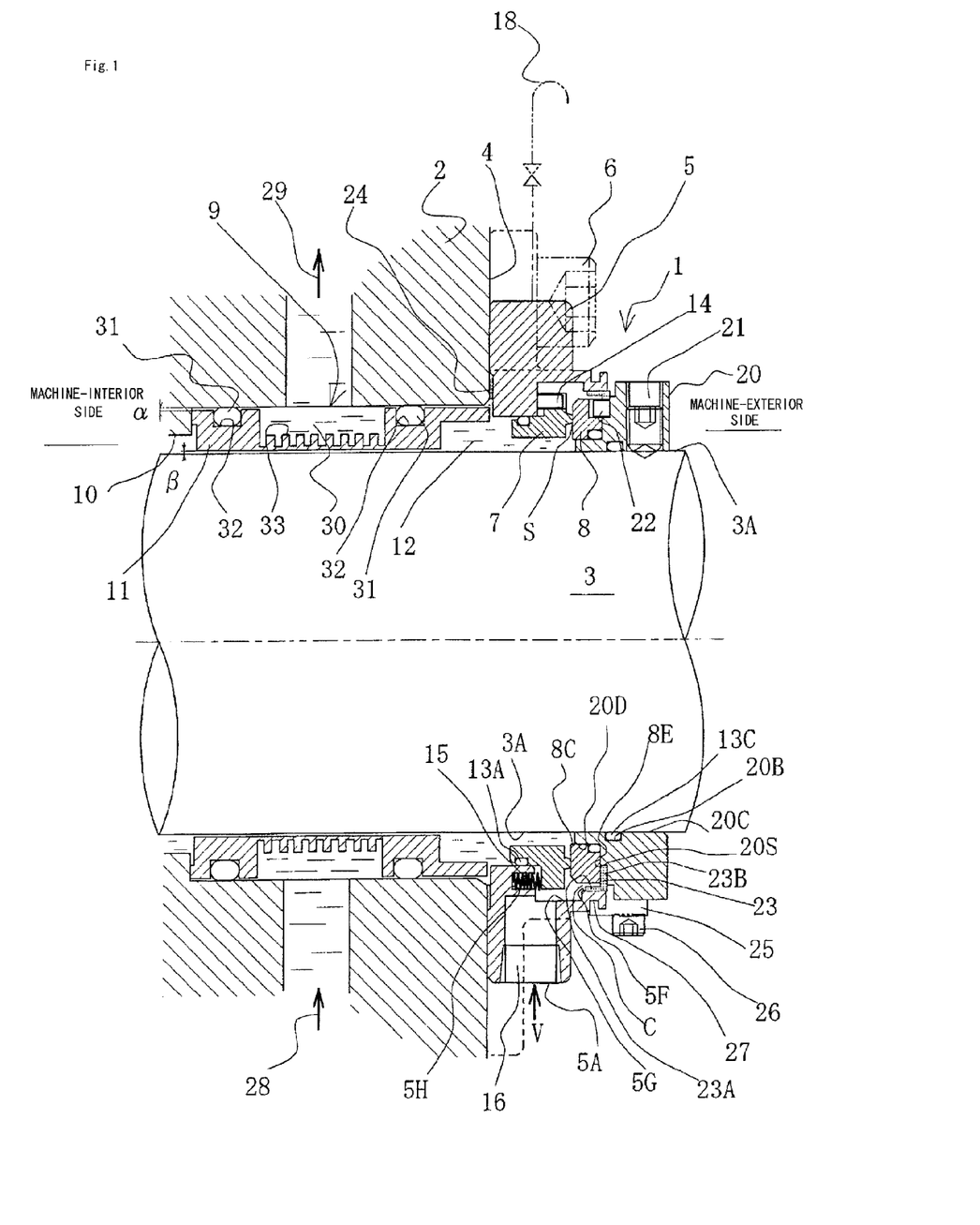
FIG. 1 is a front sectional view depicting the entire mechanical seal according to an embodiment of the invention.
Figure 2:
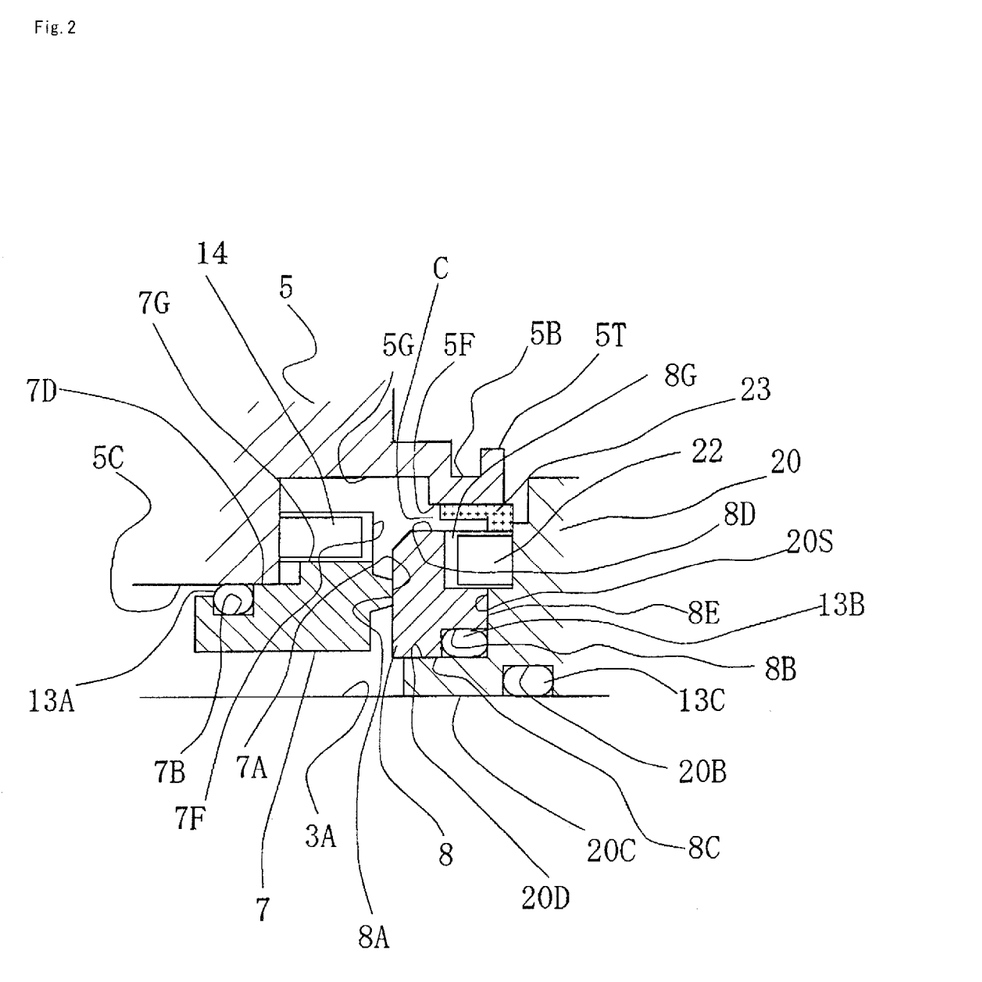
FIG. 2 is a fragmentary enlarged view depicting an enlargement of relevant parts in FIG. 1.

FIG. 1 is a front sectional view depicting the entire mechanical seal according to an embodiment of the invention; and FIG. 2 is a fragmentary enlarged view depicting an enlargement of relevant parts in FIG. 1.

The mechanical seal 1 is intended to provide a seal between a housing 2 of a shaft seal portion, and a rotating shaft 3 accommodated within a shaft bore 10 of the housing 2, in a pump for circulating a high temperature liquid in excess of 200° C., e.g. a hot water pump or hot oil pump such as a boiler feed pump or condensate pump in a thermal power plant. The mechanical seal 1 is of cartridge type designed for installation between the housing 2 and the rotating shaft 3.

In FIG. 1, the left side is the machine-interior side, and the right side is the machine-exterior side (outside air side).

The rotating shaft 3 is disposed passing through the shaft bore 10 of the housing 2. Using fastening means such as a bolt 6, a seal cover 5 is installed on the exterior side face 4 about the shaft bore 10 of the housing 2, and a stationary-side sealing element (hereinafter termed a "sealing ring") 7 and a rotating-side sealing element (hereinafter termed a "mating ring") 8 which make up the mechanical seal 1 are disposed in the space to the inside of the seal cover 5 and the outside of the rotating shaft 3.

A stuffing box 9 of expanded diameter shape is formed towards the machine-exterior side of the shaft bore 10 of the housing 2, and a cooling jacket 11 is disposed within the stuffing box 9. Thus, the mating ring 8 and the seal ring 7 are disposed at locations outside the stuffing box 9, i.e., at the machine-exterior side. Therefore, the cooling jacket 11 can be given sufficiently large capacity, and by situating the sliding faces of the mating ring 8 and the seal ring 7 to the outside air side, heat of sliding is not trapped.

The mechanical seal 1 is one of an "outside type" adapted to seal a sealed fluid 12 tending to leak towards the outside periphery direction from the inside periphery of the sliding faces S of the seal ring 7 and the mating ring 8.

The seal cover 5 is annular in shape so as to encircle the rotating shaft 3, and an opening is formed in the axial direction in the interior thereof. As shown in FIG. 2, the inside periphery face of the seal cover 5 in which the opening is formed defines, in order from the machine-interior side towards the machine-exterior side, a mating face 5C, a space portion (hereinafter termed an "annular groove") 5G, and a restriction surface 5F. Of these, the annular groove 5G is formed between the mating face 5C and the restriction surface 5F, and has larger diameter than the outside diameter of the mating face 5C. The width dimension of the annular groove 5G in the axial direction is sufficiently large that most of the seal ring 7 and the mating ring 8 are accommodated to the inside periphery of the annular groove 5G. Furthermore, the restriction surface 5F is formed on the inside periphery of the front face of the seal cover 5 (towards the machine-exterior side), in order to increase the axial direction width of the annular groove 5G.

A positioning portion 5T is disposed surrounding the opening at the front face of the seal cover 5. This positioning portion 5T is formed with a protruding axial end in order to provide a positioning groove 5B on the outside periphery.

A traveling face 7D of the seal ring 7 mates with the mating face 5C of the seal cover 5 in such a way to permit travel along the axial direction. A first seal groove 7B for an O ring adapted to provide a seal with the mating face 5C is formed on the traveling face 7D of the seal ring 7. This first seal groove 7B may be furnished, for example, with a large gap at the machine-interior side with respect to the mating face 5C in order to facilitate cleaning of deposits. An O ring 13A is mounted within this first seal groove 7B. The material of this O ring 13A may be a fluororubber, nitrile rubber, H-NBR, EPDM, a perfluoro elastomer, or the like.

Additionally, a sliding seal face 7A is formed on the seal ring 7, on the end face on the opposite side thereof from the first seal groove 7B. A flange 7F is formed on the outside periphery side of the seal ring 7. A guide groove 7G is formed in this flange 7F. A fastening pin 14 is mounted by pressure fitting into an engagement hole disposed in the side face of the annular groove 5G of the seal cover 5. The guide groove 7G engages the fastening pin 14 in such a way to permit travel thereof, and this fastening pin 14 permits travel of the seal ring 7 in the axial direction but detains it in the rotational direction. As shown in FIG. 1, the seal cover 5 in the portion thereof facing the flange 7F is provided with spring seats 5H of cavitated form situated at multiple locations in the circumferential direction. Coil springs 15 distributed equally along the periphery face are then seated in the spring seats 5H, and resiliently push against the seal ring 7.

The seal ring 7 has a design of balanced type in which the balance ratio A2/A1 is 1 or less, where A1 is the axial-direction projection area of the sliding seal face 7A of the seal ring 7 and A2 is the axial-direction projection area that is exposed to seal fluid pressure (sealed fluid pressure) acting as motive force in the axial direction on the seal ring 7, a design which reduces the load imposed on the sliding faces S by seal fluid pressure.

The seal ring 7 is fabricated from SiC by a specialty conversion process (a carbon surface is partially converted to SiC to enhance surface strength, imparting the material with both the wear resistance of SiC and the self-lubricating properties of carbon). It could also be made of diamond-coated SiC.

As shown in FIG. 1, the seal cover 5 is provided with a plurality of quenching openings 16 arranged along the circumferential direction and passing from the outside periphery face 5A to the annular groove 5G interior, and a quenching fluid V of air or an inert gas such as nitrogen gas is delivered from the quenching openings 16 situated on the horizontal, and drained from quenching openings 16 situated directly underneath.

While FIG. 1 depicts the quenching fluid V as being delivered from quenching openings 16 situated directly underneath, in actual practice it is delivered from quenching openings 16 situated on the horizontal.

The delivered quenching fluid V is then injected directly from the quenching openings 16 to the outside periphery side of the sliding faces S of the seal ring 7 and the mating ring 8. This delivered quenching fluid V is then circulated inside the annular groove 5G and expelled via the quenching openings 16 directly underneath. During this process, heat produced during sliding of the sliding faces S is cooled, and any impurities deposited on the seal ring 7 and the mating ring 8 are cleaned away.

Additionally, an air vent 18 for the purpose of venting the vapor component of the sealed fluid 12 is disposed at a location directly above in the circumferential direction of the seal cover 5. This air vent 18 communicates with the sealed fluid 12 via a passage hole, not shown, provided in the seal cover 5.

Meanwhile, the collar 20 is provided on the inside periphery with an engaging periphery face 20C and a second seal groove 20B. This engaging periphery face 20C engages the outside periphery face 3A of the rotating shaft 3, and an O ring 13C installed in the second seal groove 20B provides a seal between the engaging faces of the two components. The distal end of a set screw 21 which has been threaded into the collar 20 is retained on the outside periphery face 3A of the rotating shaft 3 to secure the collar 20 to the rotating shaft 3. The outside periphery of the collar 20 in the portion thereof situated to the inside of the mating ring 8 defines a linking face 20D. A retaining face 20S is disposed on an annular step face provided at the outside periphery side of the linking face 20D. Additionally, a drive pin 22 is mounted by bring press-fit into an engagement hole disposed in the retaining face 20S of the collar 20. Thus, there is no need to provide a sleeve on the shaft outside periphery, the seal size may be reduced by the equivalent of the sleeve thickness, peripheral speed at the sliding face is lower, and the load on the sliding face is lower.

As shown in FIG. 2, a sliding seal face 8A is formed at one edge of the mating ring 8. This sliding seal face 8A is designed to be capable of sliding while in intimate contact against the sliding seal face 7A of the seal ring 7. Additionally, a seal face 8D is provided at the outside periphery of the mating ring 8. This seal face 8D proximally mates with the restriction surface 5F of the positioning portion 5T through a gap C disposed therebetween. Through proximal mating of this seal face 8D and the restriction surface 5F, the quenching fluid V delivered from the quenching openings 16 is blocked by the action of the gap C. Further, a step face 8B for sealing purposes is formed on the inside periphery face 8C of the mating ring 8. An O ring 13B is mounted on this step face 8B, providing a seal between the engaging faces of the inside periphery face 8C of the mating ring 8 and the linking face 20D of the collar 20. A pin recess 8G is formed on a joining face 8E situated at the end of the mating ring 8 on the machine-exterior side. A drive pin 22 that has been screwed into an engagement hole in the collar 20 is inserted into this pin recess 8G to fasten the mating ring 8 and the collar 20 to one another such that the two components do not travel in the circumferential direction. Rotational force of the collar 20 is transmitted to the mating ring 8 by the drive pin 22. In this way, the rotating side comprising the mating ring 8, the collar 20, and the like is disposed such that rotation takes place in the outside air at the machine-exterior side. Thus, the rotating side experiences forced cooling by the atmosphere. Additionally, because the section of the rotating side that contacts the seal fluid is limited to the seal fluid side-facing edge faces of the mating ring 8 and the collar 20, the contact surface area with the seal fluid is small, and heat arising from rotational friction during high speed rotation is minimal.

Moreover, the mating ring 8 is fabricated of material such as SiC produced by a specialty conversion process, SiC produced by another method, a cemented carbide or other ceramic, or another material. It may also be fabricated of diamond coated SiC.

By using SiC produced by a specialty conversion process for the seal ring 7 and/or the mating ring 8 to impart lubricity and wear resistance, changes in sliding face conditions with operation for an extended period may be prevented.

Where the diameter of the rotating shaft 3 lies within a range of 100 mm or less, it is preferable to set the width of the sliding faces S of the mating ring 8 and the seal ring 7 to 1.5 mm or less, and the balance ratio A2/A1 to 0.7 or less.

Where the diameter of the rotating shaft 3 lies within a range of above 100 mm but not more than 200 mm, it is preferable to set the width of the sliding faces S of the mating ring 8 and the seal ring 7 to 2.0 mm or less, and the balance ratio A2/A1 to 0.7 or less. Thus, the liquid pressure action surface area may be kept to a minimum, and pressing force arising from fluid pressure may be minimized, thereby affording a low-heat emission design in which heat emission may be kept to a minimum as well.

Further, regardless of which of the above ranges the diameter of the rotating shaft 3 lies in, in preferred practice the gap between the inside periphery of the seal ring 7 and the outside periphery 3A of the rotating shaft is 2.5 mm or greater. By providing such a large gap between the inside periphery of the seal ring 7 and the outside periphery 3A of the rotating shaft so that seal fluid may flow through, heat can be prevented from accumulating in proximity to the sliding faces due to heat of sliding, and temperature rise can be kept to a minimum.

A lip seal 23 adapted to block the gap C between the restriction surface 5F and the seal face 8D is formed from a PTFE material as shown in FIG. 1. Specifically, this lip seal 23 is ring shaped with a mounting portion 23B formed in a vertical portion at the inside periphery side of a generally L shaped cross section, and a seal portion 23A formed in a generally horizontal portion at the outside periphery side. The mounting portion 23B is clamped between the joining face 8E of the mating ring 8 and the retaining face 20S of the collar 20. The horizontal portion 23A opens at 90 degrees or more with respect to the vertical portion 23B, and in the installed condition the seal portion 23A by virtue of the elasticity thereof is intimate contact with the restriction surface 5F. By furnishing this lip seal 23, the pressure of the quenching fluid V inside the annular groove 5G can be increased. Higher pressure of the quenching fluid V affords a cleaning action by pushing back impurities that tend to become deposited on the sliding face of the O ring 13A. Moreover, better operation in response to intimate contact of the sliding seal face 7A of the seal ring 7 against the sliding seal face 8A of the mating ring 8 in the axial direction is afforded. Additionally, leaked fluid does not get sprayed towards the bearing box, thereby preventing damage to the bearing, and preventing danger posed by splattering of leaked fluid.

A gasket 24 is disposed in the seal cover 5 between it and the housing 2, providing a seal between the housing 2 and the seal cover 5. This gasket 24 is fabricated of material such as rubber, metal coated with resin or rubber, or the like.

Further, the annular groove 5G of the seal cover 5 may be formed with a large dimension in the axial direction so as to cover most of the seal ring 7 and the mating ring 8. The side face on the machine-interior side of this annular groove 5G is formed so as to be situated in proximity to the first seal groove 7B of the seal ring 7. Additionally, the side of the annular groove 5G that faces the mating ring 8 may be extended to the medial portion of the mating ring 8. The outside periphery face of the annular groove 5G may be formed with a large diameter as well. A configuration whereby the quenching fluid V delivered from the quenching openings 16 can be delivered directly to the outside diametrical face of the sliding faces S is also acceptable. Because the width of the annular groove 5G is large enough to cover the outside periphery of the seal ring 7 and the mating ring 8, even if heat is produced by friction at the sliding surfaces S of the seal ring 7 and the mating ring 8, cooling is produced by the quenching fluid V flowing through the annular groove 5G, and a cleaning action is afforded as well.

As shown in FIG. 1, the seal cover 5 and the collar 20 are simultaneously positioned and assembled by fitting a protruding portion 27 of a set plate 25, which has been mounted onto the collar 20 with a bolt 26, into the positioning groove 5B of the seal cover 5. Then, once the mating ring 8 has been positioned, the set screw 21 is securely screwed into the rotating shaft 3 to secure the collar 20 to the rotating shaft 3.

The set plate 25 has a cross sectional profile like that shown in FIG. 1, and is mounted at three equally distributed locations on the periphery face of the collar 20. This set plate 25 may be detached subsequent to assembly.

Meanwhile, the ring-shaped cooling jacket 11 is disposed between the inside periphery of the housing 2 and the outside periphery of the rotating shaft 3 within the stuffing box 9 which is formed towards the machine-exterior side of the shaft bore 10 of the housing 2. The cooling jacket 11 has in the center section a coolant-accommodating space 30 furnished with a coolant feed opening 28 disposed directly underneath the circumferential location of the stuffing box 9 and a coolant discharge opening 29 disposed directly above; and is provided on the outside periphery at each end with O ring grooves 32, 32 for installation of the respective O rings 31, 31. The thickness of the O rings 31 is greater than the depth of the O ring groove 32. A plurality of fins 33 are disposed inside the coolant-accommodating space 30 of the cooling jacket 11, towards the outside periphery side of the rotating shaft.

The cooling jacket 11 is installed in sealed fashion along the inside periphery of the housing 2 via the O rings 31, and is installed such that there is a gap α between the outside periphery of the cooling jacket 11 and the inside periphery of the housing 2. The gap α between the outside periphery of the cooling jacket 11 and the inside periphery of the housing 2 is greater than the gap β between the outside periphery of the rotating shaft 3 and the inside periphery of the cooling jacket 11. The gap β between the outside periphery of the rotating shaft 3 and the inside periphery of the cooling jacket 11 is set to between 0.1 and 0.2 mm.

Thus, the cooling jacket 11 is disposed inside the stuffing box 9, and the gap between the outside periphery of the rotating shaft 3 and the inside periphery of and the cooling jacket 11 is reduced to an extremely small size, making the volume of intervening seal fluid in this gap extremely small, whereby the cooling effect of the cooling jacket may be maximized. Thus, the water cooled jacket provided to the conventional housing 2 is no longer necessary, allowing the design to be more compact. Moreover, by making the gap α between the outside periphery of the cooling jacket 11 and the inside periphery of the housing 2 larger than the gap β between the outside periphery of the rotating shaft 3 and the inside periphery of the cooling jacket 11, in the unlikely event of the rotating shaft 3 wobbling and the outside periphery 3A of the rotating shaft contacting the inside periphery of the cooling jacket 11, the fact that the impact is absorbed by the cushioning action provided by the elasticity of the O rings allows the contact surface pressure to be kept to a minimum, grinding or wear of the two components due to contact sliding to be prevented, the initial gap to be maintained, and the cooling effect by the cooling jacket 11 to be maximized for an indefinite period.

KEY TO SYMBOLS

1 mechanical seal
2 housing
3 rotating shaft
4 machine-exterior side face of housing
5 seal cover
6 bolt
7 stationary-side sealing element (seal ring)
8 rotating-side sealing element (mating ring)
9 stuffing box
10 shaft bore
11 cooling jacket
12 sealed fluid 13 O ring
14 fastening pin
15 coil spring
16 quenching opening
18 air vent
20 collar
21 set screw
22 drive pin
23 lip seal
24 gasket
25 set plate
26 bolt
27 protruding portion
28 coolant feed opening
29 coolant discharge opening
30 coolant-accommodating space
31 O ring
32 O ring groove
33 fin

The invention claimed is:

1. A mechanical seal for a shaft seal unit for high temperature liquids, installed on a shaft seal portion formed between a housing and a rotating shaft of a device, and providing a seal between the housing and the rotating shaft, wherein the mechanical seal is of an "outside type" for sealing a sealed fluid that may leak from an inside periphery of a sliding face towards an outside periphery; a rotating-side sealing element and a stationary-side sealing element are disposed so as to be situated externally with respect to a stuffing box which is formed between an inside periphery of the housing and an outside periphery of the rotating shaft; a stationary-side sealing element, which accommodates a spring, is installed on a seal cover that is secured to the housing; the rotating-side sealing element is installed on a collar that is installed directly on the rotating shaft; the rotating side, which comprises the rotating-side sealing element and the collar, is positioned such that rotation takes place on a machine-exterior side; a balance ratio A2/A1 is 0.7 or less, A1 being an axial-direction projection area of the sliding face of the stationary-side sealing element and A2 being an axial-direction projection area that is subjected to a seal fluid pressure acting as a motive force in the axial direction relative to the stationary-side sealing element; and an annular cooling jacket is disposed within the stuffing box which is formed between the inside periphery of the housing and the outside periphery of the rotating shaft, and a gap between the outside periphery of the rotating shaft and an inside periphery of the cooling jacket is reduced to an extremely small size, and a gap between the inside periphery of the stationary-side sealing element and the outside periphery of the rotating shaft is 2.5 mm or greater, wherein the annular cooling jacket includes a coolant-accommodating space for accommodating a coolant fluid that is different from the sealed fluid, and that communicates with coolant feed and discharge openings provided to the stuffing box, is present in a central region of the annular cooling jacket, and a plurality of fins are disposed within the coolant-accommodating space towards the outside periphery of the rotating shaft, and the annular cooling jacket is provided on an outside periphery at each end with O ring grooves for installation of respective O rings, and a thickness of the O rings is greater than a depth of the O ring groove, and the annular cooling jacket is hermetically installed along the inside periphery of the housing with O-rings interposed at the outside periphery on both ends; and a gap a between the outside periphery of the annular cooling jacket and the inside periphery of the housing is made larger than a gap $\beta$ between the outside periphery of the rotating shaft and the inside periphery of the cooling jacket, wherein due to the rotating-side sealing element and the stationary-side sealing element being installed on the outside of the stuffing box, heat of sliding may be radiated away, and the annular cooling jacket disposed inside the stuffing box can have greater capacity, and due to the rotating side being positioned such that rotation takes place in the atmosphere on a machine-exterior side, forced air cooling with outside air also may be provided.

2. The mechanical seal according to claim 1, wherein the seal cover is provided with a quenching opening for supplying air or an inert gas to a machine-exterior side of the sliding portions of the rotating-side sealing element and the stationary-side sealing element.

3. The mechanical seal according to claim 1, wherein a lip seal made of a fluororesin is installed between the rotating-side sealing element and the collar, and a seal portion of the lip seal is caused to slide in contact with a restriction surface of the inside periphery of the seal cover.

4. The mechanical seal according to claim 1, wherein the seal cover is provided with a quenching opening for supplying air or an inert gas to a machine-exterior side of the sliding portions of the rotating-side sealing element and the stationary-side sealing element.

5. The mechanical seal according to claim 1, wherein a lip seal made of a fluororesin is installed between the rotating-side sealing element and the collar, and a seal portion of the lip seal is caused to slide in contact with a restriction surface of the inside periphery of the seal cover.

6. The mechanical seal according to claim 2, wherein a lip seal made of a fluororesin is installed between the rotating-side sealing element and the collar, and the seal portion of a lip seal is caused to slide in contact with a restriction surface of the inside periphery of the seal cover.

7. The mechanical seal according to claim 4, wherein a lip seal made of a fluororesin is installed between the rotating-side sealing element and the collar, and a seal portion of the lip seal is caused to slide in contact with a restriction surface of the inside periphery of the seal cover.

8. The mechanical seal according to claim 2, wherein the inert gas is nitrogen gas.

9. The mechanical seal according to claim 4, wherein the inert gas is nitrogen gas.

10. The mechanical seal according to claim 1, wherein the device comprises a hot water pump or a hot oil pump.

* * * * *